Figure 1:
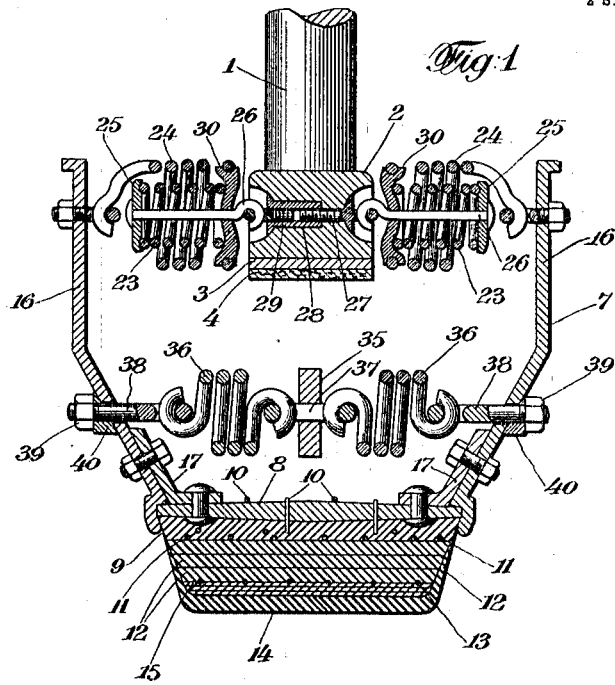

J. F. & H. E. SIPE.
SPRING WHEEL FOR VEHICLES.
APPLICATION FILED JUNE 21, 1909.

1,106,008.

Patented Aug. 4, 1914.
2 SHEETS—SHEET 1.

Witnesses:
John O. Gempler
W. A. Hutton

John F. Sipe,
Harry E. Sipe,
Inventors

By their Attorneys
Kenyon & Kenyon.

J. F. & H. E. SIPE.
SPRING WHEEL FOR VEHICLES.
APPLICATION FILED JUNE 21, 1909.
1,106,008.
Patented Aug. 4, 1914.
2 SHEETS—SHEET 2.
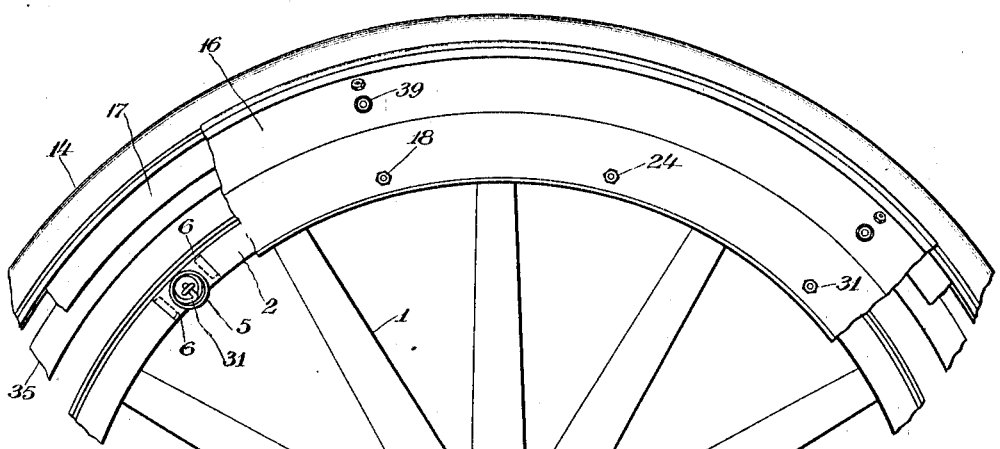
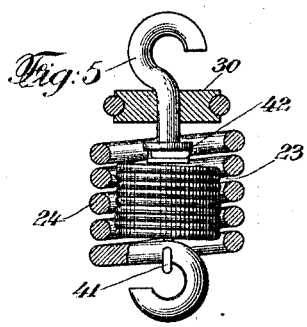
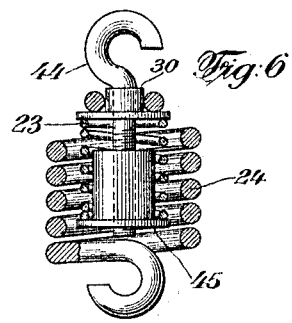
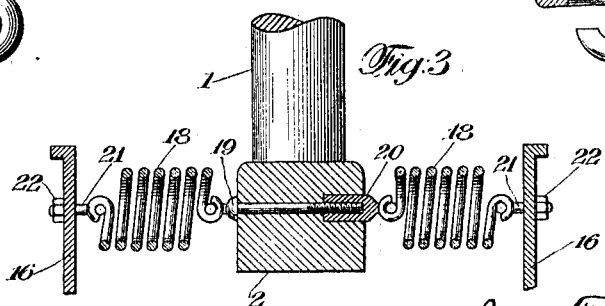
Witnesses:
John O. Gempler
W. A. Hutton
John F. Sipe
Harry E. Sipe
Inventors,
By their Attorneys
Kenyon & Kenyon

UNITED STATES PATENT OFFICE.

JOHN F. SIPE AND HARRY E. SIPE, OF NEW YORK, N. Y.

SPRING-WHEEL FOR VEHICLES.

1,106,008.

Specification of Letters Patent.

Patented Aug. 4, 1914.

Application filed June 21, 1909. Serial No. 503,276.

*To all whom it may concern:*

Be it known that we, JOHN F. SIPE and HARRY E. SIPE, citizens of the United States, and residents of New York city, in the county and State of New York, have invented certain new and useful Improvements in Spring-Wheels for Vehicles, of which the following is a specification.

The objects of our invention are to provide a spring wheel for vehicles having great resilience and a great scope of spring action; to secure this extended scope of action by bringing into operation automatically different springs or series of springs at different times; to so construct and combine the springs as to require only a small movement or scope of action from the springs which are brought into play when the load or shock becomes heavy and which meet the hard shocks; to increase the durability of the springs and the strength and safety of the device, by arranging most of the springs so that only a small movement thereof is required; to reduce the weight of the springs and thus to secure economy; to provide lighter springs for the initial load, and heavier springs for the heavier loads; to provide a greater resisting power for meeting the heavy loads and shocks than it is possible to secure with springs all of which are in operation under all loads or at all times; to provide a tread member which is strong and durable and efficient, and which can be easily attached to or removed from the hub member; and generally to provide a wheel which is economical in construction and durable, and which has comfortable riding qualities.

The invention consists first in combining the hub member of the wheel with the tread member of the wheel by a plurality of series of springs placed between the two members, the springs being parallel with the axis of the wheel, each series of springs being arranged partly on one side of the plane of the wheel and partly on the other, and the springs of one series alternating with the springs of another series around the circumference of the wheel, the springs being so arranged that the springs of different series are brought into action at different times.

The invention also consists in providing one or more series of springs which are connected with one of the members only and which pass through openings in the other member, whereby when the members have moved to a certain extent or a certain amount relatively to each other under the influence of the load or shock, the springs will be brought into operation, and where several such series are employed, the series will be brought into operation successively.

The invention also consists in combining with the hub member and the tread member a series of double springs connecting the two members, each of the double springs consisting of a lighter spring and a heavier spring, one within the other, the lighter spring being attached to one member and the heavier spring being attached to the other, whereby the lighter spring is first brought into operation, and after it has been extended or compressed the heavier spring is brought into operation.

The invention also consists in providing an annular plate or ring and connecting it with one of the members by a series of springs, and so arranging or suspending the plate or ring by means of these springs, that upon a certain increase of load or shock the other member will come into contact with the said plate or ring, and the plate or ring will thus be brought into operation and will tend to support the increased load or resist the increased shock. In the best form of this invention the plate or ring is connected with the tread member and encircles or surrounds the hub member, and the springs which connect it with the tread member are connected at their outer ends with the tread member, and at their inner ends with the ring or plate, and are oppositely arranged or disposed some on one side of the ring or plate, and some on the other.

The invention also consists in making the different springs, or different series of springs, of different degrees of strength or powers of resistance, so that the springs which are brought into play later in point of time and under the heavier loads or shocks, will be the more powerful and will offer greater resistance to the load or shock than could be secured by springs which are in operation all the time.

The invention also includes other features of construction and combinations of parts which are hereinafter set forth and specifically recited in the claims.

The details of the construction may be greately varied without departing from the scope of the invention.

The invention is illustrated in the accompanying drawings in which—

Figure 2:
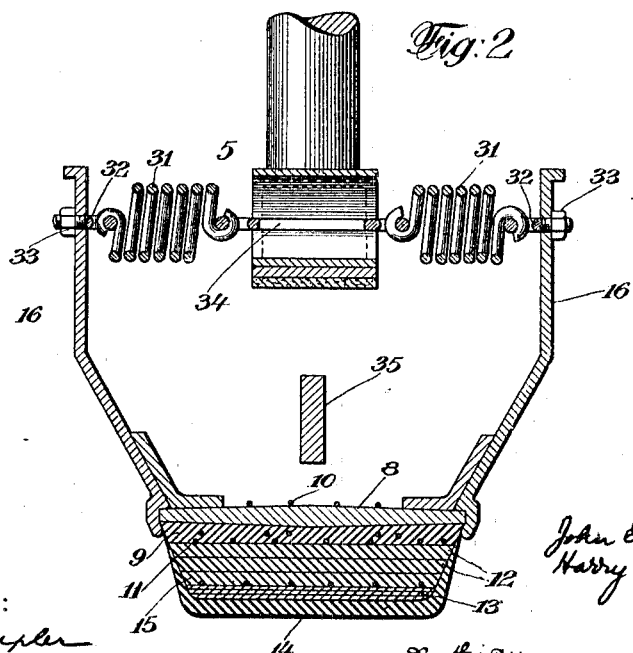

Figure 1 shows a cross-sectional view of the part of the wheel including a portion of the spoke, the felly, the tread member, and two of the series of connecting springs; Fig. 2 is a similar cross-sectional view on a different plane showing another series of springs; Fig. 3 is a similar cross-sectional view on another plane showing another series of springs, this figure showing only the upper ends of the side plates of the tread member; Fig. 4 is a side view of a portion of the wheel, showing the way in which the different series of springs are arranged around the wheel; Fig. 5 is a cross-sectional view of a form of double spring which may be used in place of the form of double spring shown in Fig. 1; Fig. 6 is a cross-sectional view of another form of double spring.

In these figures similar numbers indicate corresponding parts.

Referring to the drawings, 1 represents the spokes of the wheel; 2 is the felly, which is preferably provided with a steel tire 3 on the outer periphery thereof, and with a leather covering 4 outside of the steel tire. The wooden part of the felly is made in sections, and between these sections are placed the steel tubes 5 running crosswise of the felly (see Fig. 2), thereby forming openings through the felly through which some of the supporting springs or spring devices may extend. The tubes 5 are provided with steel sockets 6 on each side, which are brazed to the steel tubes or fastened to the steel tubes in any other suitable manner. These sockets receive and hold the ends of the sections of the wooden part of the felly, as shown in Fig. 4. In this manner the steel tubes, with their sockets, connect the different portions of the felly, and in effect form an integral part of the felly itself. It is manifest that other methods might be adopted of forming these openings through the felly through which some of the spring devices extend.

7 is the tread member of the wheel. This tread member consists of the following parts.

8 is an annular metal plate, preferably made of steel; it is made with a thickened middle portion, as shown. We prefer to make the plate in the form shown in the drawings in which the thickness of the same gradually increases from the sides to the middle portion.

9 is a layer of rubber compound placed on the outside of the plate 8 and vulcanized to that plate.

10 is a wire which is laced through the plate 8 and its covering of rubber compound 9 in any suitable manner to fasten the two together. This wire passes over the inner surface of the plate 8 for a certain distance, then down through the plate and into the covering 9, and then through the covering 9 for a suitable distance, and then up through the covering 9 and the plate 8 again and over the surface of the plate 8, and so on.

11 is a wire or wire support which passes circumferentially around the wheel so as to aid in binding the rubber layer 9 to the plate 8.

12, 12 are layers of rubber and fabric which are vulcanized to the rubber coating 9 in any suitable manner.

13 are layers of canvas, or other suitable textile material, placed outside of the layers 12.

14 is the tread portion proper which is made of rubber and vulcanized to the underlying portions of rubber or rubber fabric.

15 are wires embedded in the tread, as shown, and passing circumferentially around the same. In the particular form shown in the drawings these wires 15 are placed between the layers 12 and the layers 13.

16, 16 are annular steel plates encircling the wheel and forming the side walls of the tread member. These plates are fastened to the annular plate 8 by means of the angle irons 17 which are bolted or riveted to the plates 8 and 16, as shown, or fastened thereto in any other suitable manner.

The hub member is connected with or suspended in the tread member by three series of coiled springs. The first series of coiled springs is shown in Fig. 3, being marked 18. These springs are fastened at their inner ends by any suitable means to the felly. As shown in Fig. 3, a screw-threaded bolt 19 is passed through the felly and is screwed into a screw-threaded socket 20. The bolt 19 is provided with a head which bears against one side of the felly, and the socket 20 fits into a recess in the felly as shown. The bolt and the socket are provided with eyes at their outer ends to receive the hooked ends of the springs 18.

21 are bolts passing through the plates 16 and provided with eyes at their inner ends to engage the outer hooked ends of the springs 18. The bolts 21 are secured in place by the nuts 22 bearing against the outer surface of the plate 16.

The second series of springs is shown in the upper part of Fig. 1. These springs are double coiled springs consisting of the inner and lighter springs 23, and the outer and heavier springs 24. The springs 23 are placed within the springs 24.

25 is a plate which bears against the outer end of the spring 23.

26 is a bolt provided with a head bearing against the outer surface of the plate 25, and passing through the spring 23, and provided with a hooked portion at its inner end.

27 is a screw-threaded bolt provided with a head as shown to bear against the surface of the felly, and adapted to pass through an opening in the felly and to be screwed into a screw-threaded socket 28 which is also seated in a recess in the felly.

29 is a screw-threaded bolt adapted to be screwed into the socket 28 as shown. The bolts 27 and 29 are provided with eyes at their outer ends which engage with the hooked ends of the bolts 26.

30 is a plate against which the inner end of the spring 23 bears. This plate 30 is provided with a groove on its circumference, as shown, to receive the inner end of the spring 24, by means of which the plate and the spring are suitably connected. The spring 24 and the plate 30 may be secured together in any other suitable manner. The inner spring 23 is made much lighter than the outer spring, so that the inner spring will be compressed before the outer spring 24 is brought into action to any substantial extent.

31 represents a third series of coiled springs which are fastened to the plate 16 at their outer ends by the bolts 32, which are provided with eyes at their inner ends, and the nuts 33. The springs 31 are joined together at their inner ends by a steel rod 34, which is provided at its ends with eyes which engage with the inner hooked ends of the springs 31. The rod 34 passes through the steel tubes 5, which form a part of the felly. When the vehicle is unloaded, or when it is operating under a light load, the rod 34 is not in contact with the steel tubes 5. When, however, the load is increased, or the vehicle is subjected to a sufficient shock, the hub member moves downwardly between the walls 16 and the tread member until the steel tube 5 comes in contact with or strikes the rod 34. The springs 31 are then brought into action and assist in supporting the load and resisting the shock.

35 is an annular steel plate or ring which encircles the wheel surrounding the hub member and between which and the hub member a considerable space is left as represented in Figs. 1 and 2. This ring is connected with or suspended from the walls 16 of the hub member by the coiled springs 36 which are made very heavy and very strong and preferably with but few coils. These coiled springs are connected with the ring 35 in any suitable way, as for example by a rod 37 passing through the ring 35 and provided with eyes at its ends which engage with the inner hooked ends of the spring 36. The outer ends of the springs 36 are fastened to the plates 16 by bolts 38 provided with eyes at their inner ends, and with nuts 39 at their outer ends bearing against suitable washers 40 placed between the nuts and the plates 16, as shown in Fig. 1. In the case of a very heavy load or of an unusually severe shock, the hub member will move downwardly between the plates 16 and will strike the ring 35 and the springs 36 will thus be brought into action to help sustain the load and resist the shock.

The four series of springs which have been described, are all placed parallel to the axis of the wheel and are arranged on opposite sides of the hub member, or the middle plane of the wheel, some of the springs being on one side of the plane of the wheel, and the rest of the springs being on the other side, and the springs extending outwardly in opposite directions from the inner to the outer member. The springs are all preferably arranged in pairs as shown.

The operation of the device is as follows: The springs 18 are made of such size and strength as to support the vehicle body when there is no load or when there is a minimum load. When the load is increased, or a shock is encountered, the hub member moves downwardly between the walls of the tread member, and the inner springs 23 of the series of double springs are next brought into action. As the load or shock increases these springs 23 are gradually compressed. Before these springs are entirely compressed, however, the hub member is moved downwardly a sufficient distance to bring the steel tube 5 into contact with the rod 34, and thus to bring the springs 31 into operation. As the load or shock increases beyond this point, the springs 23 are finally compressed to such an extent as to bring into operation the outer springs 24 of the series of double springs. If the load or shock becomes still greater so that the hub member moves downwardly enough to strike the ring 35, the springs 36 are then brought into action. These springs 36 are made of such strength and resisting power as to offer great resistance to the load or shock.

In Fig. 5 we have shown another form of double spring which may be substituted in place of that shown in Fig. 1. In this form the inner spring 23 is made very light and is connected at the outer end with the larger spring 24 by simply hooking the end of the spring 23 over the spring 24 as shown at 41. The inner end of the spring 23 is wound around, or otherwise fastened to a grooved plate 42 connected with the inner end of the bolt 43, which bolt 43 passes through the plate 30 and is adapted to be hooked to the felly. The plate 42 acts as a stop. When this stop strikes the plate 30, owing to the downward movement of the hub member, the spring 24 is then brought into operation. The inner spring 23 in this case may be made so light that it will merely serve to draw the bolt 43 inwardly through the plate 30 when there is no load or strain on this double spring. This will prevent the rattling of the parts.

In Fig. 6 we have shown still another form of double spring in which there is a bolt 44 provided with a hooked end adapted to be engaged with the felly. The bolt 44 is screw-threaded as shown, and there is a plug 45 with a screw-threaded opening adapted to be screwed on to the bolt 44 as shown. The outer end of the spring 23 bears against a collar or projection on the end of the plug 45. The inner spring 23 is confined between this collar and the plate 30. The inner end of the plug 45 acts as a stop. When this inner end of the plug 45 strikes the plate 30, the outer spring 24 will be brought into operation. By adjusting the plug 45 on the bolt 44, the time at which, or the load or shock under which, the spring 24 can be brought into operation, can be changed or varied.

In the best form of our invention we make the springs of the different series of different strengths or powers of resistance. Thus the springs 18 are made of sufficient strength to carry the body when there is no load or under a normal load. The springs 31 are made somewhat stronger. The springs 24 are made still more powerful, and the springs 36 are made still stronger than the springs 24.

Many advantages are secured by the invention. The wheel has great resiliency, and produces great ease and comfort in riding. By arranging the springs so that they are brought into action at different times, the springs which are not in action all the time have a smaller range of movement. They may therefore be made lighter in weight and with fewer coils. The springs which do not come into action except under heavy loads or shocks, may be made exceedingly strong and powerful, and yet they may be lighter in weight and with fewer coils than if they were in operation during the entire movement of the two members relatively to each other. The tread member is simple, compact, and strong in its construction, and is readily adapted to be attached to any form of hub member. The tire is so constructed that creeping is avoided, and the tread member proper is held in position firmly without clamps or bolts.

The construction of the wheel is simple and relatively economical, and it is adapted to stand great strains and shocks without breaking or getting out of repair.

What we claim as new and desire to secure by Letters Patent, is:

1. In a spring wheel, the combination of a hub member, a tread member, and a plurality of series of springs between the two members, arranged parallel with the axis of the wheel, some of the springs of each series being on one side of the plane of the wheel and the other springs of said series being on the other side of the plane of the wheel, one or more of the series of springs being attached to both members so as to be in operation all of the time, and one or more of the series of springs being attached to one of the members only and arranged in such relation to the other member as to be moved thereby and brought into operation subsequently to the other series of springs.

2. In a spring wheel, the combination of a hub member, a tread member, and several series of springs between the two members, the springs being set parallel to the axis of the wheel, some of the springs of each series being on one side of the plane of the wheel, and the other springs of that series being on the other side of the plane of the wheel, the springs of the several series being arranged around the wheel alternately, one or more series of springs being attached to both members, and one or more series being attached to one of the members only, and arranged in such relation to the other member as to be moved thereby and brought into operation subsequently to the other series of springs.

3. In a spring wheel, the combination of a hub member, a tread member, and several series of springs between the two members, one series of springs being attached to both members, and a second series of springs connected with one of the members only and passing through openings in the other member so as to be brought into operation after the first series, and a third series of double springs, each double spring consisting of a lighter spring and a heavier spring, one within the other, the lighter spring being attached to one member and the heavier spring to the other, whereby the lighter spring is first brought into operation and then the heavier one, substantially as set forth.

4. In a spring wheel the combination of a hub member, a tread member and a series of double springs connecting the two members, each double spring consisting of a lighter spring and a heavier spring one within the other and arranged to act in an endwise direction, the lighter spring being attached to one member and the heavier spring to the other, whereby the lighter spring is first brought into operation and then the heavier one, substantially as set forth.

5. In a spring wheel the combination of a hub member, a tread member and a series of double springs connecting the two members, each double spring consisting of a lighter spring and a heavier spring one within the other, the lighter spring being attached to one member and the heavier spring to the other, and means for adjusting the springs relatively to each other, whereby the lighter spring is first brought into operation and then the heavier one, substantially as set forth.

6. In a spring wheel the combination of a hub member, a tread member and a series of double springs connecting the two members, each double spring consisting of a lighter spring and a heavier spring one within the other, the lighter spring being attached to one member and the heavier spring to the other, and an adjustable stop connected with one of the springs, whereby the lighter spring is first brought into operation and then the heavier one, substantially as set forth.

7. In a spring wheel, the combination of a hub member, a tread member, and a plurality of springs between the two members connected at their inner ends to the hub member and at their outer ends to the tread member, and extending some in one direction and some in the opposite direction from the hub member, an annular ring, encircling the hub member, and springs connecting the ring with the tread member, whereby the ring will come into contact with the hub member upon a certain increase of load or shock.

8. In a spring wheel, the combination of a hub member, a tread member, and a suitable spring connection between the two members, of a plurality of springs connected with one of the members only, and set approximately parallel to the axis of the wheel, and passing through openings in the other member, whereby when the members have moved a certain amount relatively to each other, the springs will be brought into operation.

9. In a spring wheel the combination of a hub member, a tread member and a series of double springs connecting the two members, and set approximately parallel to the axis of the wheel, each double spring consisting of a lighter spring and a heavier spring one within the other arranged to act in an endwise direction, the lighter spring being attached to one member and the heavier spring to the other, whereby the lighter spring is first brought into operation and then the heavier one, substantially as set forth.

10. In a spring wheel, the combination of a hub member, a tread member, and a plurality of springs between the two members connected at their inner ends to the hub member and at their outer ends to the tread member, and extending some in one direction and some in the opposite direction from the hub member, and set approximately parallel to the axis of the wheel, an annular ring encircling the hub member, and springs connecting the ring with the tread member, whereby the ring will come into contact with the hub member upon a certain increase of load or shock.

11. In a spring wheel, the combination of a hub member, a tread member, and several series of coiled springs between the two members, one series of springs being attached to both members, and a second series of springs connected with one of the members only and passing through openings in the other member so as to be brought into operation after the first series, and a third series of double springs, each double spring consisting of a lighter spring and a heavier spring, one within the other, the lighter spring being attached to one member and the heavier spring to the other, whereby the lighter spring is first brought into operation and then the heavier one, substantially as set forth.

12. In a spring wheel the combination of a hub member, a tread member, and a series of double coiled springs connecting the two members, each double spring consisting of a lighter spring and a heavier spring one within the other arranged to operate in an endwise direction, the lighter spring being attached to one member and the heavier spring to the other, whereby the lighter spring is first brought into operation and then the heavier one, substantially as set forth.

In testimony whereof, we have signed our names to this specification, in the presence of two subscribing witnesses.

JOHN F. SIPE.
HARRY E. SIPE.

Witnesses:
EDWIN SEGER,
JOHN O. GEMPLER.